United States Patent
Stefani et al.

(10) Patent No.: US 9,789,509 B2
(45) Date of Patent: Oct. 17, 2017

(54) DECORATING MACHINE PARTICULARLY FOR THE DECORATION OF CERAMIC PRODUCTS AND METHOD FOR REALISING A BELT FOR DECORATING SAID CERAMIC PRODUCTS

(71) Applicant: SYSTEM S.P.A., Fiorano Modenese (Modena) (IT)

(72) Inventors: Franco Stefani, Sassuolo (IT); Carlo Antonio Camorani, Roteglia di Castellarano (IT)

(73) Assignee: SYSTEM S.P.A., Fiorano Modenese (IT)

( * ) Notice: Subject to any disclaimer, the term of this patent is extended or adjusted under 35 U.S.C. 154(b) by 196 days.

(21) Appl. No.: 14/427,544

(22) PCT Filed: Sep. 18, 2013

(86) PCT No.: PCT/IB2013/058631
§ 371 (c)(1),
(2) Date: Mar. 11, 2015

(87) PCT Pub. No.: WO2014/045207
PCT Pub. Date: Mar. 27, 2014

(65) Prior Publication Data
US 2015/0209817 A1    Jul. 30, 2015

(30) Foreign Application Priority Data
Sep. 20, 2012  (IT) .............................. MO2012A0225

(51) Int. Cl.
*B05C 1/14* (2006.01)
*B28B 11/00* (2006.01)
(Continued)

(52) U.S. Cl.
CPC .............. *B05C 1/14* (2013.01); *B28B 11/001* (2013.01); *B28B 11/047* (2013.01); *B29D 29/06* (2013.01);
(Continued)

(58) Field of Classification Search
USPC .......................................... 118/211, 212, 600
See application file for complete search history.

(56) References Cited

U.S. PATENT DOCUMENTS

| 5,316,524 | A | 5/1994 | Wong et al. |
| 8,337,947 | B2 | 12/2012 | Camorani |

(Continued)

FOREIGN PATENT DOCUMENTS

| EP | 2402824 A1 | 1/2012 |
| IT | 1314624 | 10/2001 |

(Continued)

*Primary Examiner* — Yewebdar Tadesse
(74) *Attorney, Agent, or Firm* — Pearne & Gordon LLP

(57) ABSTRACT

A decorating machine particularly for the decoration of ceramic products, and a method for realizing a belt for decorating said ceramic products, wherein the machine comprises: a closed loop belt (3) for the transfer of a decoration (9) on a receiving surface (11) of a ceramic product; a plurality of conveyor rollers (2) about which said belt (3) is wound and moved in rotation; at least one of said conveyor rollers (2) comprises a central portion (12) and two end portions (14) opposite one another, at least one of said end portions (14) being free in rotation with respect to the other said portions (12, 14).

18 Claims, 4 Drawing Sheets

(51) Int. Cl.
  *B28B 11/04* (2006.01)
  *F16G 3/10* (2006.01)
  *B29D 29/06* (2006.01)
  *B41J 2/005* (2006.01)
  *G03G 15/00* (2006.01)

(52) U.S. Cl.
  CPC ............ *B41J 2/0057* (2013.01); *F16G 3/10* (2013.01); *G03G 15/755* (2013.01); *Y10T 29/49863* (2015.01)

(56) References Cited

U.S. PATENT DOCUMENTS

| | | |
|---|---|---|
| 8,837,989 B2 | 9/2014 | Yasumoto |
| 2004/0101619 A1 | 5/2004 | Camorani |
| 2009/0010682 A1 | 1/2009 | Camorani |
| 2009/0111632 A1 | 4/2009 | DeLair et al. |
| 2011/0318048 A1 | 12/2011 | Yasumoto |
| 2012/0154497 A1* | 6/2012 | Nakao .................... B41J 2/0057 347/102 |
| 2013/0129994 A1* | 5/2013 | Wells, Jr. ................ C04B 41/89 428/207 |

FOREIGN PATENT DOCUMENTS

| | | |
|---|---|---|
| JP | H04-148746 A | 5/1992 |
| JP | H07-32484 | 2/1995 |
| WO | 2005025828 A1 | 3/2005 |
| WO | 2007096746 | 8/2007 |

\* cited by examiner

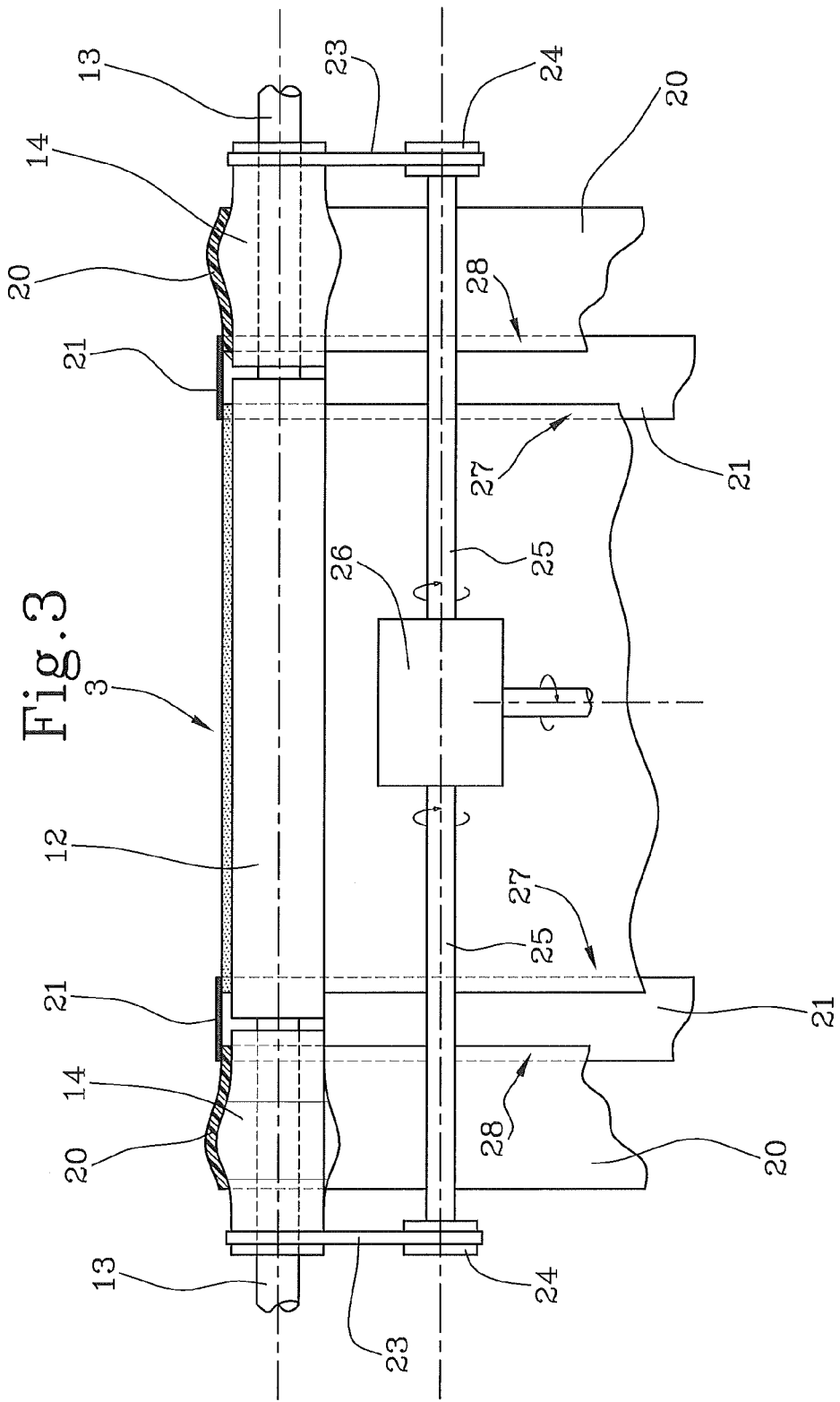

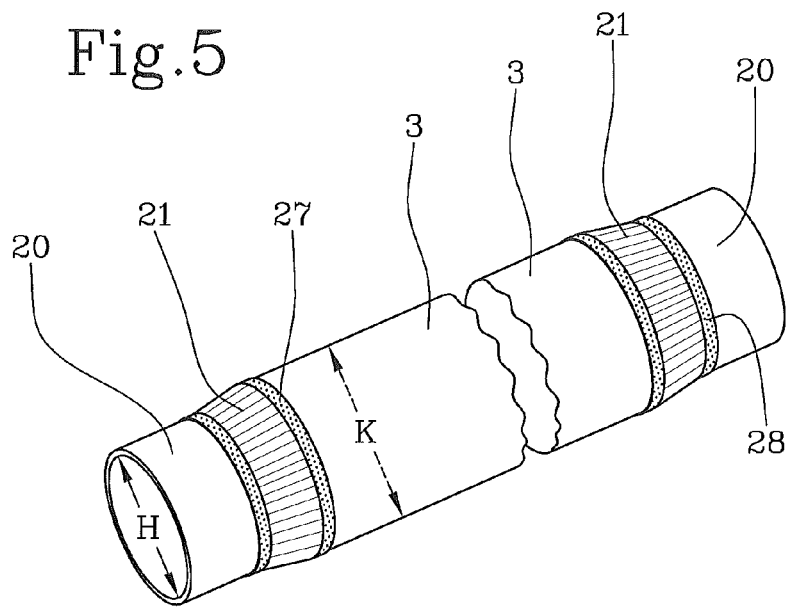
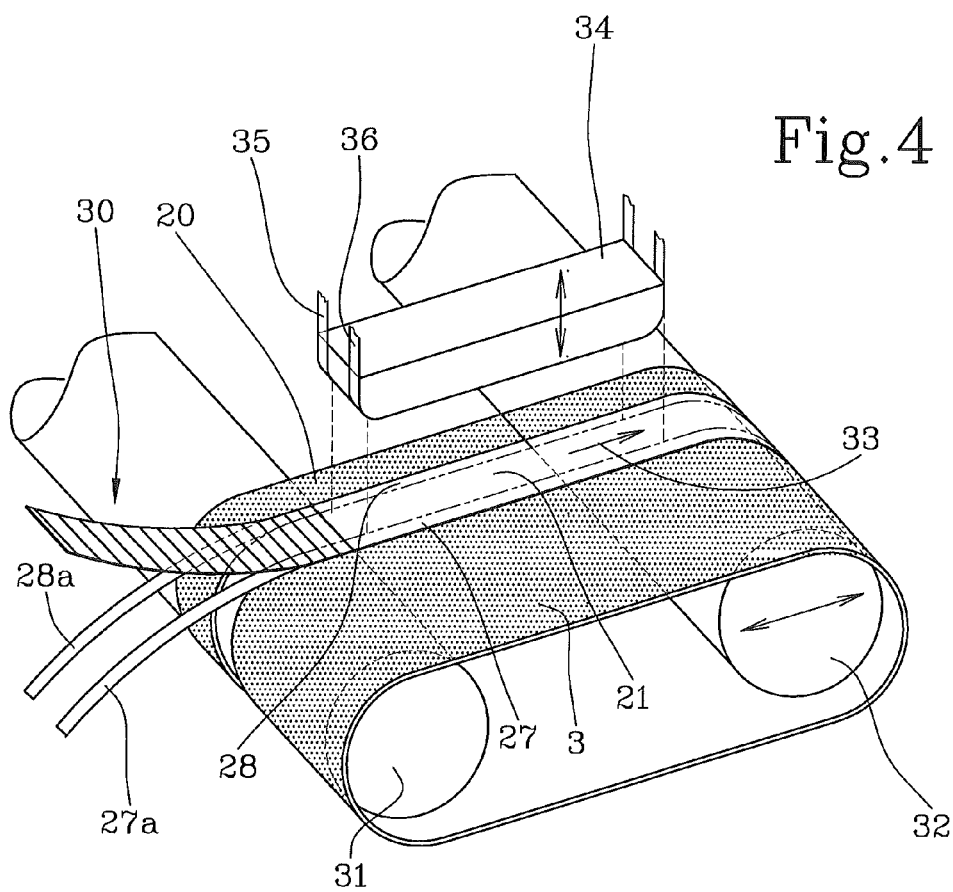

DECORATING MACHINE PARTICULARLY FOR THE DECORATION OF CERAMIC PRODUCTS AND METHOD FOR REALISING A BELT FOR DECORATING SAID CERAMIC PRODUCTS

A decorating machine particularly for the decoration of ceramic products constitutes the object of the present invention. A method for realising a belt for decorating ceramic products, forming part of the machine cited above, constitutes a further object of the present invention.

Specifically, but not exclusively, the present invention refers to a transfer decorating machine, utilising powdered or granular material, mainly used for the decoration of ceramic articles such as ceramic tiles.

There are known decorating systems which comprise preforming, on a transfer belt, or surface, an image constituted by liquid ejected from inkjet apparatuses, having the decorating material in powdered or granular form (hence the name "dry" decorating) adhere to this image and then transferring the decoration thus obtained onto the receiving surface of the object being decorated.

Compared to traditional ink-jet technologies, systems such as these offer the significant advantage of eliminating all risk of possible blockage and wear of the delicate inkjet apparatuses, given that the decorating material does not pass through the inkjet apparatus, which only operates with simple liquids that are free of suspensions of solids even if consisting of fine particles.

Moreover, in this manner granular or powdered decorating materials can be utilised, with a very broad range of choice as regards materials and aesthetic results.

Examples of such transfer systems are described in IT1314624, WO2005025828 and WO2007096746.

One way of transferring a decoration to the receiving surface of the object to be decorated, consists in setting the section of the belt facing the receiving surface in rapid vibration.

To obtain effective vibration, the belt used must be as thin as possible and it is a closed loop belt, conveyed in rotation over supporting and driving rollers.

However, the use of a very thin belt leads to a significant drawback mainly owing to the structure of the belt itself. In fact, during rotation, the belt is not capable of resisting lateral compression, and it inevitably tends to fold and overlap, resulting in problems with proper depositing of the decoration. There are thus considerable difficulties involved in maintaining the flatness of the film and the correct direction of advancement.

To overcome this drawback, there are also known machines for the decoration of ceramic materials that utilise perforated printing plates, obtained from thin, polyester laminates welded in a closed loop. These thin laminates are normally capable of resisting slight lateral compression, however they have other problems related to movement.

In fact, it should be considered that for proper conveyance of these laminar plates, in the proximity of the two lateral edges evenly spaced holes are provided, in which pegs predisposed in the driving rollers engage. As a result, the laminate cannot be tensioned much as it must have the possibility to slide over the respective supporting rollers so that the holes can be positioned correctly with respect to the pegs, so as to avoid the tearing of the laminate around the holes, by effect of the penetration of the pegs.

Moreover, the systems for engagement between the belt and rollers tend to cause irregular advancement, which, however limited it may be, can damage the quality of the transferred image.

Furthermore, there are also known active systems for correct axial positioning of belts, with detection sensors for detecting the axial position and actuators suitable for changing the direction of the axis of one or more driving rollers based on the signals sent by the sensors.

However, this solution also has its drawbacks, mainly related to the complexity of the construction process determined by the presence of the sensors.

Additionally, the sensor system proves to be ineffective for maintaining the transverse flatness of thin films.

The aims described hereinabove are achieved by a decorating machine particularly for ceramic products and by a method for realising a belt for decorating the ceramic products, characterised as stated in the claims appended herein below.

The technical features of the present invention, according to the above-mentioned aims, are clearly identifiable in the contents of the claims appended herein below, and the advantages thereof will become more apparent in the detailed description that follows, provided with reference to the accompanying drawings, which represent an embodiment thereof solely by way of non-limiting example, and in which:

FIG. 3 is the same view appearing in FIG. 2 according to a second embodiment of the decorating machine;

FIG. 4 is a perspective view showing one step for realising a belt advantageously utilised in the machine appearing in FIG. 1; and FIG. 5 is a schematic, perspective view of the belt utilised in the machine appearing in FIG. 1.

With reference to the figures cited, 1 indicates, in its entirety, a decorating machine, particularly for the decoration of ceramic products.

Figure 1:
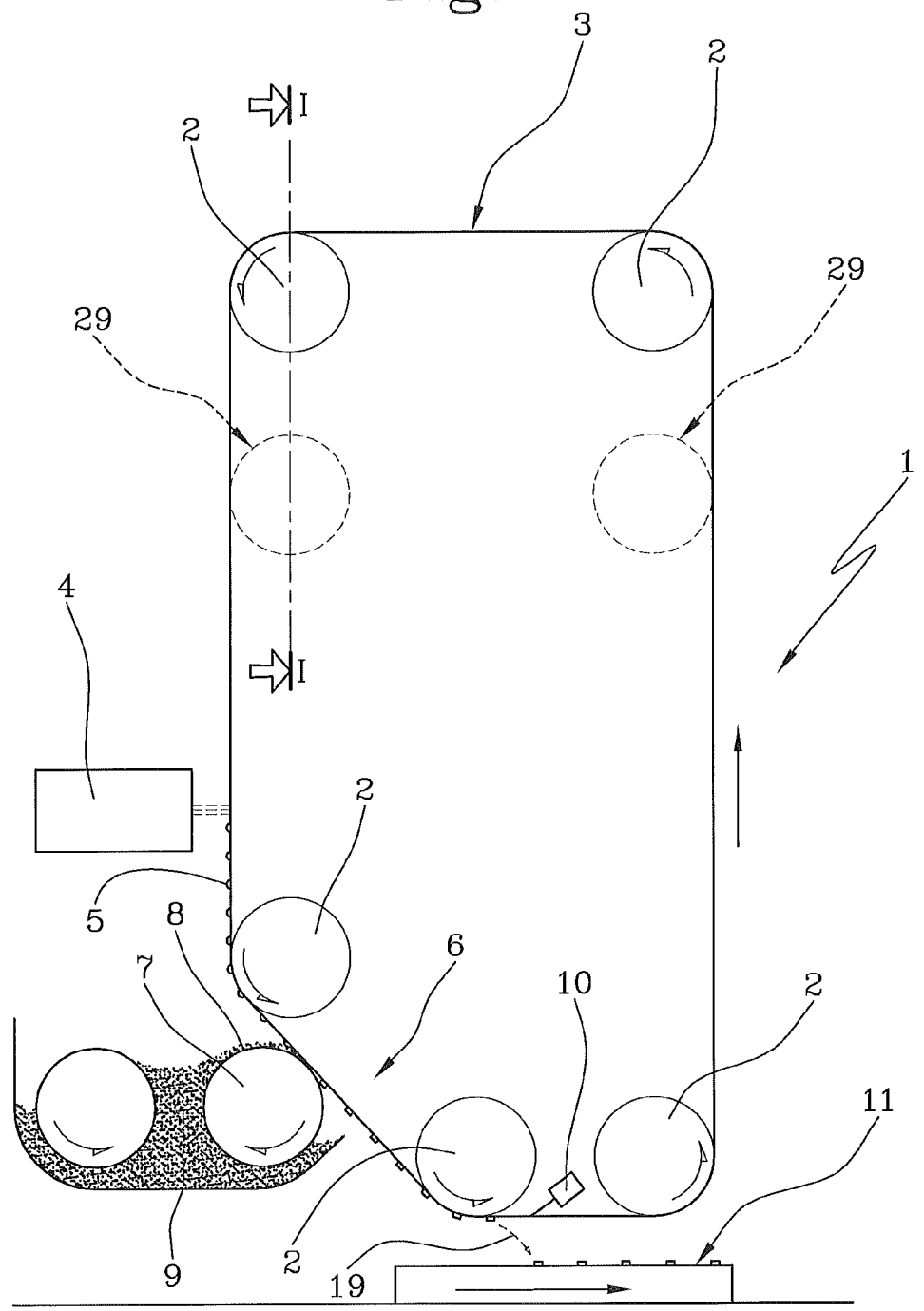
FIG. 1 is a schematic, side elevation and sectional view of a decorating machine according to the present invention.

With reference to FIG. 1, the decorating machine 1 comprises a series of parallel-axis rollers 2 for moving a thin belt 3 constituted by a tubular film. An inkjet apparatus 4 suitable for forming an image 5 on the film 3 is located in a vertical descending section. In a subsequent inclined section 6, a rotor 7 is arranged with slight interference on the film 3 and it is coated with a layer 8 of granular decorating material 9, which adheres to the film 3 at the point of the image 5. In the low part, inside the film loop 3, an actuator 10 brings about vibration on the relative section of film 3, forcing the decorating material 9 to detach from the film and deposit on the receiving surface 11.

Figure 2:
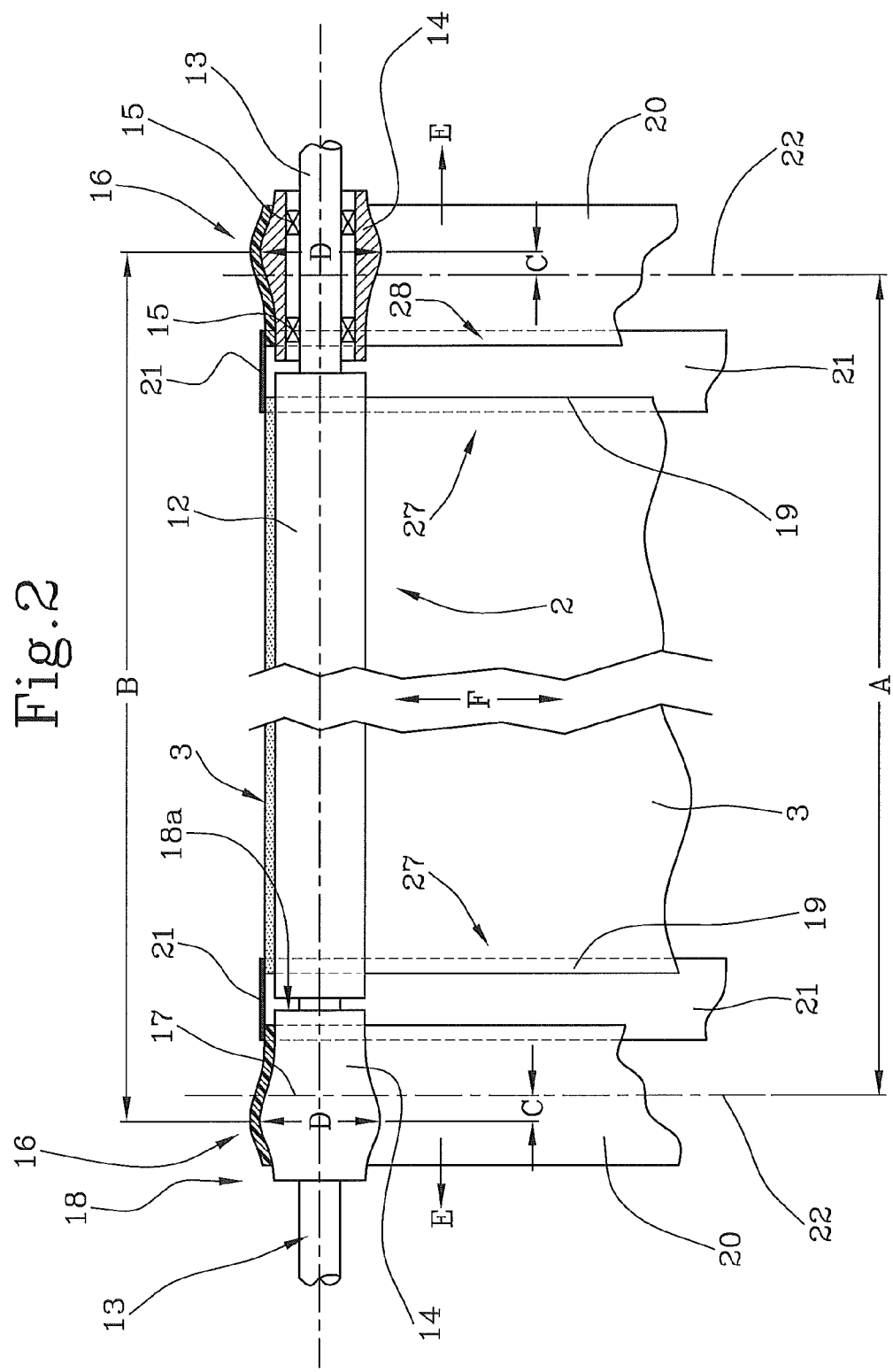
FIG. 2 is a sectional view along the I-I line of the decorating machine appearing in FIG. 1.

As illustrated in FIG. 2, each roller 2 comprises a central cylindrical part 12 and two solidly constrained shafts 13 that extend out at the two ends and on which the support bearings and possible driving means (not shown) are cooperating in the end part thereof. On each shaft 13, in the zone near the cylindrical part 12, there is a roll 14 coaxial with and free to rotate on bearings 15. The external diameter of the roll 14 is approximately equal to that of the roller 2 in the central part 12, except for an intermediate zone 16 gradually increasing in diameter, with the maximum diameter D located between the centreline 17 and the external end part 18. This intermediate zone 16 of maximum diameter D has a section connected with the adjacent zones and is found in a remote position with respect to the flank 18a of the end portion 14 facing the central portion 12. The belt 3 rests on the cylindrical rollers 12 and is anchored on the two lateral edges 19 to respective flat belts 20, which rest on the rolls 14. Anchored with thermofused adhesive under pressure, to the edges of the belt 3 by interposition of a strip 21 of polyester fabric, these flat belts 20, are elastically elongated in the operating stage so that a given load and good contact on the surface of the rolls 14 are ensured at all times.

The distance A between the centreline 22 of the two flat belts 20 is shorter than the distance B between the two points of maximum diameter D of the rolls 14 of a height of C+C.

In operation, rotation is transmitted to one or more rollers 2 by means of the shafts 13, and the belt 3 is thus set into motion and drives the flat belts 20 and the relative rolls 14. Not being aligned with respect to the point of maximum diameter D leads each one of the flat belts 20 to move outwards in the direction D, thus transversely tensioning the belt 3. In addition to the transverse tensioning, a very stable directional equilibrium is also achieved in this manner, determined by the equilibrium of the forces in the transverse direction E that is established between the two flat belts 20. The belt 3 which is also tensioned in the longitudinal direction F thus assumes a rigid, flat state, which remains very stable given that the flat belts 20, rotating on the idle rolls 14, will follow the dominant position of the belt 3 with minimum resistance and synchronously.

In FIG. 3 a further embodiment is illustrated, in which the movement can be transmitted by means of the rolls 14, rather than the shafts 13. In this case as well, the rolls 14 are idle with respect to the rollers 12 and 13, and motion is transmitted to these rolls 14 through belts 23, pulleys 24 and axle shafts 25 connected to a differential system 26 suitable for evenly distributing the torque. In this manner, the belts 20 will be driving the belt 3, and the differential 26 will enable these belts 20 to advance synchronously, adjusting to the position dictated by the tensioned belt 3. Advantageously, this solution is utilised in the case in which there is a low level of friction between the roller 12 and the belt 13, for example in the case in which there is a need not to tension the belt 3 too much, or when one wishes to transmit motion from only one of the rollers 12.

With the aim of ensuring maximum efficiency of the system, it is important that strong friction exists between the flat belt 20 and the roll 14. This can be achieved with a special rubber coating in the inner part of the belt 20 and by having the outer surface of the roll 14 made of steel (or chrome-plated metal), with a surface polished to a mirror-like finish, or with an integrated coating, for example a rubber coating. Excellent results are achieved with NP5601 belts (UR 40U NSTR BLACK/GREY) made by the Forbo Siegling firm, used with the rubber surface intended for the outside, facing inward instead.

As stated hereinabove, the roll 14, in the part thereof facing inward, has a slightly smaller diameter than the diameter of the roller 12; the difference in this diameter is adopted to compensate for the difference in thickness between the flat belt 20 and the belt 3.

As mentioned hereinabove, the belt 3 is constituted by a tubular film and it will be advantageously made of low-density polyethylene that is electrically conductive and of a thickness as uniform as possible in a range of 0.02 to 0.1 mm approximately, preferably 0.025 to 0.05 mm, for example, with differences in thickness being contained more or less within approximately 10%, with respect to the nominal thickness. Other more resistant polymers may be used advantageously, however, at the present state, there are some problems involved in obtaining electrically conductive films of this thickness using blown film technology. The surface electrical resistivity needed to prevent alterations of the image due to electrostatic attractions, is advantageously within the range of 0.5 K$\Omega$m to 20 K$\Omega$m.

A step of the method for realising the belt 3, which is also an object of the present invention, is illustrated in FIG. 4.

The flat belts 20 must be longitudinally elastic so that the peripheral development thereof can adapt to the development of the film 3, and thus, to obtain proper tensioning of these belts 20 during operation, they must have a peripheral development in the untensioned state that is smaller than that of the film 3. Using the NP5601 belts of 65 mm in width, this difference will amount to about 4%. Therefore, the belts 20 must be welded to the tubular film 3 while they are in a state of elastic elongation so that the peripheral measurement thereof corresponds to that of the film 3. Particular measures should be adopted for the welding so as to avoid creating weak points that could trigger breakage, also because this welding zone would be found in a particularly critical work zone, that is, on the ends of the roller 12 and the roll 14. To overcome this drawback and to solve the problems related to incompatibility in the bonding of the polyethylene film 3 onto the belt 20, a strip 21 made of polyester fibre fabric is interposed and is thus capable of easily withstanding all the stresses and continuous deformations during passage on the edges of the rollers 12 and the rolls 14. In this manner, the welding process is also facilitated, given that the most suitable adhesives and suitable bonding temperatures can be employed on each of the two edges of the strip 21. Therefore, to keep the polyethylene film 3 intact, an adhesive 27a to be used in the internal edge 27 of the strip 21 will have a markedly lower melting temperature than that of the polyethylene, whereas in the external edge 28, an appropriate adhesive 28a with a higher melting temperature will be employed. In both cases, the strip 21 of polyester fabric having a relatively much higher melting temperature compared to the other materials, will remain intact and be perfectly permeated by the adhesive and integrated thereto. For this purpose, it may prove to be useful that the weave of this strip 21 be quite loose. Moreover, to prevent the strips 21 from hindering proper longitudinal tensioning of the film 3 during operation, it is advantageous that the strips 21 have a certain degree of elasticity or longitudinal pliability, which can be achieved for example with a preliminary embossing process 30 prior to welding or in another manner. The thin hot-melt strip 27a must have different characteristics of adhesiveness on both faces, so that the bottom face is compatible with the PELD and the upper face is compatible with the polyester.

As can be seen in FIG. 4, the welding procedures can be facilitated by proceeding according to the following operational steps: positioning of the belt 20 and the tubular film 3 on the reference rollers 31, 32; lateral movement of the roller 32 so as to elongate the belt 20 to a peripheral development corresponding to the peripheral development of the film 3; advancement of the strip 21 in the direction 33, together with the hot-melt strips 27a, 28a. This procedure can be carried out automatically or semi-automatically by a special movable gripper (not shown), which unwinds the components from the respective reels (not shown); lowering of the heating rod 34 and activation of the two heating elements 35, 36 so as to heat the hot-melt strips 27a, 28a to the right degree; lifting of the heating rod 34 and repetition of the cycle after having advanced the tubular film 3 with the relative belt 21 by one step. In these subsequent steps, intervention of the movable gripper will not be necessary as the elements 21, 27a, 28a are already connected.

Instead of a step-by-step procedure such as the one described, the bonding of the belts 20 to the tubular film 3 can also be carried out in a continuous manner, gradually advancing the bonding front along the entire circumference.

The final result is that illustrated in FIG. 5, where it is possible to observe the appearance of the disassembled belt, which will have an internal diameter H at the belts 20 that is markedly smaller than the diameter K at the film 3.

As shown in FIG. 1, some of the rollers 2 can be retreated into a different position 29 to facilitate the procedures for assembling and disassembling the belt 3. The assembly procedure is extremely simple as the belt 3 has no engagement constraints. It is sufficient for it to be approximately positioned projecting beyond the point of the maximum diameter D of the rolls 14, after which it will be tensioned longitudinally repositioning the rollers 29 and, upon the starting up of rotation, it will automatically bring itself into the correct arrangement.

In a further (unillustrated) embodiment of the invention, as in the case shown in FIG. 3, movement shall be transmitted through the rolls 14, but, unlike the case in FIG. 3, the motors shall be independent in each one of the two rolls 14. In this case, to maintain the correct synchronism, reference marks shall be present on the belts (20) and a system for the detection of the relative position thereof shall act suitably on the speed of the motors so as to maintain the synchronism.

An example of a decorating machine with five conveyor rollers 2 according to the scheme shown in FIG. 1, is realised according to the following parameters:

rollers with a central portion 12 of a diameter of 60 mm and a length of 730 mm;
end portions 14 of a diameter of 56.5 mm in the internal part and 60 mm in the point of maximum diameter D;
distance B between the maximum diameters D: 840 mm;
distance A between the interaxis of the belts 20: 812 mm;
height C: 14 mm;
flat belts 20 NP5601 (Forbo Siegling)—width: 65 mm, thickness: 1.5 mm, untensioned development: 1545 mm;
PELD film 3—thickness: 0.05 mm, (untensioned) peripheral development: 1600 mm;
development of the path of the belt 3 and flat belts 20 in the tensioned state during the operating stage: 1610 mm, approximately;
rotation motion transmitted to the central portion 12 on three of the five conveyor rollers 2.

The invention claimed is:

1. A decorating machine for decoration of ceramic products, comprising:
a closed loop belt (3) for the transfer of a decoration (9) on a receiving surface (11) of a ceramic product;
a plurality of conveyor rollers (2) about which said closed loop belt (3) is wound and moved in rotation;
at least one of said plurality of conveyor rollers (2) comprises a central portion (12) and two end portions (14) opposite one another, at least one of said two end portions (14) being free in rotation with respect to the other said end and central portions (12, 14);
characterised in that each of said two end portions (14) has a variable diameter; said variable diameter reaching a maximum diameter (D) in a remote position with respect to a flank (18a) of each of said two end portions (14) close to the central portion (12);
characterised in that the closed loop belt (3) comprises a central portion thin in thickness and defining respective lateral edges (19) constrained to flat cooperating belts (20) tensioned on said two end portions (14); interaxes of said flat cooperating belts (20) defining a distance (A) between the interaxes of flat cooperating belts shorter than a distance (B) defined between the maximum diameters (D) of said opposite two end portions (14).

2. The decorating machine according to claim 1, characterised in that said maximum diameter (D) reaches the maximum in an intermediate position (16) of each of the two end portions (14).

3. The decorating machine according to claim 1, characterised in that the at least one of the plurality of conveyor rollers (2) has a respective central portion (12) that is motorized.

4. The decorating machine according to claim 1, characterised in that the at least one of the plurality of conveyor rollers (2) has respective end portions (14) that are motorized and connected to a differential means (26).

5. The decorating machine according to claim 1, characterised in that the at least one of the plurality of conveyor rollers (2) has respective opposite end portions (14) connected to distinct motorisations; striking means being arranged on said flat cooperating belts (20) to determine the position in the direction of advancement and control means maintaining the synchronisation between said flat cooperating belts (20).

6. The decorating machine according to claim 5, characterised in that said flat cooperating belts (20) are elastically deformable lengthwise and the inside surface thereof is provided with a high coefficient of friction.

7. The decorating machine according to claim 1, characterised in that said end portions have a metal surface with a glossy finish.

8. The decorating machine according to claim 1, characterised in that said closed loop belt (3) comprises a central zone consisting of a tubular, unwelded and electrically conductive polymeric film.

9. The decorating machine according to claim 8, characterised in that said flat cooperating belts (20) in the untensioned state, have a peripheral development that is smaller than the peripheral development of the said closed loop belt (3).

10. The decorating machine according to claim 1, characterised in that said lateral edges (19) and said flat cooperating belts (20) are connected by interposition of a fabric strip (21).

11. The decorating machine according to claim 10, characterised in that said closed loop belt (3) comprises a central zone consisting of a tubular, unwelded and electrically conductive polymeric film; and further characterised in that said fabric strip (21) has a higher melting temperature than the melting temperature of the said polymeric film and the fabric strip is welded to the said polymeric film by means of hot-melt adhesive (27a) thermofused under pressure.

12. The decorating machine according to claim 11, characterised in that said fabric strip (21) is made of polyester fabric.

13. The decorating machine according to claim 8, characterised in that said polymeric film is of a thickness ranging between 0.02 mm and 0.1 mm and is obtained using "blown film" technology.

14. The decorating machine according to claim 8, characterised in that said polymeric film is made of polymer charged with carbon black and/or nanotubes of carbon.

15. The decorating machine according to claim 8, characterised in that said polymeric film has a surface electrical resistivity ranging between 0.5 KΩm and 20 KΩm.

16. The decorating machine according to claim 8, characterised in that said polymeric film is made of polyethylene.

17. The decorating machine according to claim 8, characterised in that said polymeric film has been made to be hydrophilic in the external surface by means of plasma treatment.

18. The decorating machine according to claim 8, characterised in that said flat cooperating belts (20) in the untensioned state have an internal diameter (H) ranging between 0.99K and 0.90K, K being the internal diameter of the said tubular polymeric film.

* * * * *